United States Patent [19]

Emerson

[11] 3,794,863

[45] Feb. 26, 1974

[54] TURN SIGNAL INDICATOR SWITCHING CIRCUIT

[75] Inventor: L. Frank Emerson, Williamsport, Pa.

[73] Assignee: GTE Sylvania Incorporated, Seneca Falls, N.Y.

[22] Filed: June 6, 1973

[21] Appl. No.: 367,517

Related U.S. Application Data

[63] Continuation-in-part of Ser. No. 265,616, June 23, 1972, abandoned.

[52] U.S. Cl. ................. 307/310, 307/240, 307/285, 323/69, 331/111

[51] Int. Cl. .......................... H03k 17/60, G05f 3/10

[58] Field of Search ... 307/239, 240, 265, 272, 297, 307/310; 323/68, 69; 328/3, 175, 209; 331/108 R, 111

[56] References Cited

UNITED STATES PATENTS

| | | | |
|---|---|---|---|
| 3,028,473 | 4/1962 | Dyer et al. | 307/310 X |
| 3,048,718 | 8/1962 | Starzec et al. | 307/310 X |
| 3,757,229 | 9/1973 | Murphy | 307/310 X |

*Primary Examiner*—Rudolph V. Rolinec
*Assistant Examiner*—L. N. Anagnos
*Attorney, Agent, or Firm*—Norman J. O'Malley; Thomas H. Buffton; Cyril A. Krenzer

[57] ABSTRACT

A turn signal switching circuit includes a thermistor coupled to a potential source by first and second heating means and shunted by a first load circuit with a second load circuit coupled to the first load circuit by a switching means and shunting the second heating means.

8 Claims, 3 Drawing Figures

TURN SIGNAL INDICATOR SWITCHING CIRCUIT

CROSS-REFERENCE TO OTHER APPLICATIONS

This application is a continuation-in-part and incorporates the disclosure set forth in a parent application entitled "Bi-Stable High Current Switching Circuit," filed June 23, 1972 in the name of L. Frank Emerson, bearing U.S. Ser. No. 265,616, and now abandoned, and assigned to the assignee of the present application.

BACKGROUND OF THE INVENTION

Switching circuits and particularly those employed in the automotive industry for turn signal indicator switching are usually mechanical in nature. In other words, thermocouples or similar mechanical devices are employed to effect a repetitive on-off switching operation whereby the turning direction of the automobile is indicated.

Although such mechanical apparatus has been and still is employed with success in a multitude of automotive vehicles, it has been found that such apparatus does leave something to be desired. More specifically, it has been found desirable to effect switching circuitry which operates above and is substantially unaffected by ambient temperatures.

OBJECTS AND SUMMARY OF THE INVENTION

An object of the present invention is to provide an improved high current switching circuit. Another object of the invention is to provide an enhanced automotive turn signal indicator switching circuit. Still another object of the invention is to provide an improved switching circuit operable at a temperature greater than the ambient temperature. A further object of the invention is to provide switching circuitry employing a thermistor with associated heating and heat-sinking elements.

These and other objects, advantages and capabilities are achieved in one aspect of the invention by a high current switching circuit having a thermistor coupled to a potential source by first and second heating means and shunted by a first load circuit with a second load circuit shunting the second heating means and coupled to the first load circuit by a switching means.

PREFERRED EMBODIMENT OF THE INVENTION

Figures 1, 2, 3:
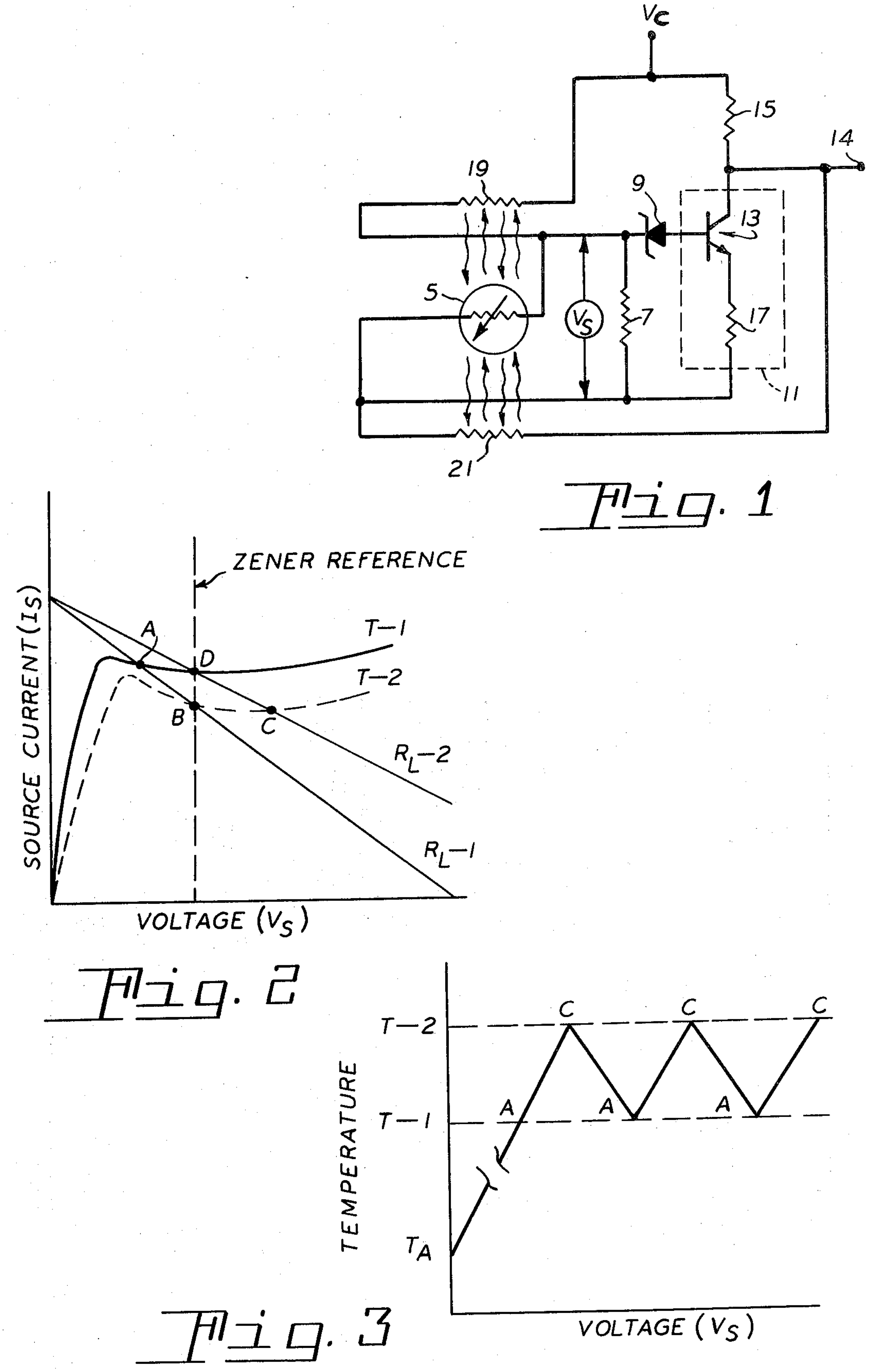
FIG. 1 is a schematic illustration of a preferred form of high current switching circuitry.
FIG. 2 is a current-potential source plot illustrating the temperature and load operational characteristics of the embodiment of FIG. 1.
FIG. 3 is a plot illustrating the output potentials available from the embodiment of FIG. 1.

For a better understanding of the present invention, together with other and further objects, advantages and capabilities thereof, reference is made to the following disclosure and appended claims in connection with the accompanying drawings.

In the drawings, FIG. 1 illustrates a preferred form of high current switching circuitry suitable for use in a turn signal indicator in an automobile. The circuitry includes a potential source Vc and a thermistor 5 which is shunted by a first load circuit 7. A switching means

9 in the form of a zener diode in this instance couples the first load circuit 7 to a second load circuit 11.

The second load circuit 11 includes a transistor 13 having a collector electrode coupled to an output terminal 14 and to the potential source $Vc$ by way of a resistor 15. A resistor 17 couples the emitter electrode of the transistor 13 to the junction of the parallel connected thermistor 5 and first load circuit 7. A first heating means 19 and a second heating means 21 are in heat responsive relationship to the thermistor 5 and couple opposite ends thereof to the potential source $Vc$. Moreover, a voltage $Vs$ appears across the thermistor 5 and parallel connected first load circuit 7.

As to operation, reference is made to the diagrammatic illustration of FIG. 2 in conjunction with the schematic illustration of FIG. 1. Upon activation of the potential source $Vc$ a current ($Is$) flows through the first load circuit 7 developing a potential ($Vs$) thereacross. Utilizing the above-mentioned current flow ($Is$) and developed potential ($Vs$) a load line $R_{L-1}$ of FIG. 2 may be constructed. Moreover, current flow through the first heating means 19 causes heating of the thermistor 5 to an operational temperature T-1 of FIG 2. Thus, a first stable operational point, point "A", is attained at the intersection of the load line $R_{L-1}$ and operational temperature T-1 as determined by the heat derived from the first means 19 and applied to the thermistor 5.

Also, current flows from the potential source Vc through a resistor 15 and the second heating means 21. Heat from the second heating means 21 is directed onto the thermistor 5 whereupon a second operational temperature, T-2 of FIG. 2 is attained. Thus, the operational potential Vs advances along the first load line $R_{L-1}$ to a second operational point "B" whereat the potential Vs is of an amount sufficient to render the switching means 9 conductive.

Upon activation of the switching means 9, the operational potential $Vs$ is applied to the second load circuit 11 to effect current flow therethrough and construction of a second load line, $R_{L-2}$ of FIG. 2. Since activation of the switching means 9 caused addition of the second load circuit 11, the operational point moves rapidly from the second operational point "B" to a third operational point "C" on the second load line $R_{L-2}$.

Also, activation of the switching means 9 into a conductive state causes application of a forward bias potential at the base of the transistor 13 of the second load circuit 11. Thereupon, the transistor 13 is rendered conductive and, for all practical purposes, shunts the second heating means 21 whereupon the second heating means 21 acts as a heat sink for the thermistor 5. Thus, the thermistor 5 advances along the second load line $R_{L-2}$ from the second operational temperature T-2 at the third operational point "C" to the fourth operational point "D".

Upon reaching the fourth operational point "D", the switching means 9 is again activated but into a non-conductive rather than a conductive state. Thereupon, the second load circuit $R_{L-2}$ is disconnected and operation immediately and rapidly returns to the first or original operational point "A" as determined by the original operational temperature T-1 and first load line $R_{L-1}$.

As can readily be seen in the illustration of FIG. 3, activation of the circuitry causes energization of the first heating means 19 whereupon the thermistor 5 is shifted from an ambient temperature Ta to a first operational temperature T-1. Thereupon, the second heating means 21 causes the temperature of the thermistor 5 to advance to a second operational temperature T-2. Thus, the operational potential Vs advances along the first load line $R_{L-1}$ from a first stable position "A" to a second operational position "B", whereat the switching means 9 is activated, and then rapidly to a second substantially stable operational position "C" on a second load line $R_{L-2}$ and at a second operational temperature T-2.

Thereafter, the second heating means 21 is, in effect, short circuited by the second circuit 11 whereupon the thermistor 5 cools along the second load line $R_{L-2}$ until the switching means 9 is rendered non-conductive. Following, the second load circuit 11 is disconnected and the system rapidly returns to the original operational point "A" on the first load line $R_{L-1}$ and at the first operational temperature T-1.

Thus, there has been provided a unique high current switching circuit especially suitable as a turn signal for automotive vehicles. The circuitry is relatively inexpensive of components and assembly time while providing enhanced reliability because of the relatively high current values employed. More importantly, the circuitry operates above the ambient temperatures normally encountered in known mechanical apparatus. Thus, automobile turn signal indicators, for example, no longer have greatly varying frequencies or speeds in accordance with ambient temperatures. Rather, the repetitive speed of operation is uniform, consistant, and independent of the ambient temperature.

While there has been shown and described what is at present considered the preferred embodiment of the invention, it will be obvious to those skilled in the art that various changes and modifications may be made therein without departing from the invention as defined by the appended claims.

What is claimed is:

1. An automotive turn signal indicator switching circuit comprising:

a potential source;

a thermistor;

first and second heating means associated with said thermistor and coupling opposite ends thereof to said potential source;

a first load circuit shunting said thermistor;

a second load circuit shunting said second heating means; and switching means coupling said first and second load circuits whereby energization of said first and second heating means and first load circuit provide one operational condition and activation of said switching means effecting energization of said second load circuit provides another operational condition.

2. The switching circuit of claim 1 wherein said switching means is in the form of a zener diode.

3. The switching circuit of claim 1 wherein said second load circuit includes a transistor coupled to said potential source, said switching means, and to the junction of said second heating means and thermistor.

4. The switching circuit of claim 1 wherein said thermistor is disposed in heat responsive relationship to said first and second heating means.

5. An automotive turn signal indicator switching circuit comprising:

a thermistor;

a first load circuit shunting said thermistor;

a potential source;

first and second heating means coupling said thermistor and first load circuit to said potential source;

a switching means coupled to said first load circuit and first heating means; and a second load circuit coupled to said switching means, said potential source, and the junction of said thermistor, first load circuit, and second heating means.

6. The turn signal switching circuit of claim 5 wherein said first load circuit is in the form of a resistor and said second load circuit includes a series connected transistor and resistor.

7. The turn signal switching circuit of claim 5 wherein said second load circuit includes a transistor having a base electrode coupled to said switching means, a collector electrode coupled to said potential source, and an emitter electrode coupled to said junction of said thermistor, first load circuit and second heating means.

8. The turn signal switching circuit of claim 5 wherein said first and second heating means are in the form of resistors and said second heating means provides heat for said thermistor upon energization and absorbs heat from said thermistor upon deenergization.

* * * * *